United States Patent [19]
Avins

[11] 3,804,981
[45] Apr. 16, 1974

[54] BRIGHTNESS CONTROL

[75] Inventor: Jack Avins, Princeton, N.J.

[73] Assignee: RCA Corporation, New York, N.Y.

[22] Filed: Nov. 2, 1972

[21] Appl. No.: 303,021

[30] Foreign Application Priority Data
Nov. 8, 1971 Great Britain .................. 51,851/71

[52] U.S. Cl. .......................... 178/7.3 R, 178/7.3 DC
[51] Int. Cl. ............................................ H04n 5/14
[58] Field of Search...... 178/7.3 R, 5.4 ML, 5.8 AF, 178/DIG. 39, DIG. 29, 7.5 DC, 7.5 D, 7.3 D, 7.3 DC, 5.4 MC, 7.5 R; 330/22, 40, 17, 19, 29

[56] References Cited
UNITED STATES PATENTS 3,597,540 8/1971 MacIntyre ....................... 178/7.3 R
3,564,137 2/1971 MacIntyre ........................... 178/5.4
3,600,514 8/1971 Poppy ............................ 178/7.3 R

*Primary Examiner*—Robert L. Richardson
*Assistant Examiner*—R. John Godfrey
*Attorney, Agent, or Firm*—Eugene M. Whitacre; Kenneth R. Schaefer

[57] ABSTRACT

Television video signal processing circuits suitable for construction in integrated circuit form. Direct current, contrast and brightness controls are provided as well as retrace blanking and automatic brightness limiting (ABL) functions. In a color television receiver, the luminance channel and chrominance channel controls may be interconnected to maintain desired relationships between contrast, brightness and color level as each control is adjusted.

9 Claims, 3 Drawing Figures

BRIGHTNESS CONTROL

VIDEO SIGNAL PROCESSING CIRCUITS

This invention relates to video signal processing circuits and, in particular, to such circuits which are useful in the luminance signal amplifying channel of a color television receiver.

Circuits to be described herein are suitable for fabrication in large part in the form of monolithic silicon integrated circuits and will be illustrated in that form.

In a color television receiver, it is customary to provide separate amplifying channels for the respective luminance and chrominance signal components of the composite color television signal developed at the output of the second (picture) detector of the receiver. The luminance channel amplifier arrangements to be described herein, in addition to providing the required amplification of the luminance signal, also include provisions for retrace blanking of the associated display device, peaking of the luminance frequency response, customer operated contrast and brightness controls and automatic brightness limiting (ABL) functions. The arrangements to be described also permit direct current coupling of the output of the video detector to the image-reproducing device, or, if desired a portion of the d.c. information may be removed at, for example, the input of the described video signal processing arrangements.

In accordance with one aspect of the present invention, a video signal processing arrangement comprises a source of image-representative video signals coupled to an input electrode of a transistor amplifier device. A load impedance and an operating voltage supply are coupled in circuit with output and common electrodes of the amplifying device. A main current path of a variable conduction transistor also is direct current coupled to the load impedance. The flow of direct current through the last-named transistor and the load impedance may be varied by means of brightness controlling means coupled to a control electrode of the variable conduction transistor.

In accordance with a further aspect of the present invention, a first image blanking transistor is coupled across the combination of the variable conduction transistor and the load impedance and is responsive to blanking signals for cutting off direct current flow in said variable conduction transistor.

In accordance with a still further aspect of the present invention, a normally non-conductive automatic brightness limiting transistor is coupled across the combination of the variable conduction transistor and the load impedance and is responsive to limit conditions in associated high voltage generating apparatus for reducing direct current flow through said load impedance.

In accordance with a still further aspect of the present invention, a gain controlling transistor, having a collector-emitter circuit direct current coupled between base and emitter of the amplifier device, is arranged to vary the signal gain of the amplifier device and thereby control contrast associated with such image-representative signals. A variable source of direct current is coupled to the base of the gain controlling transistor and, via a resistor, to the joined base of the amplifier device and collector of the controlling transistor to provide such control.

Other aspects of the present invention are set forth in the following description in conjunction with the accompanying drawings.

Figure 1:
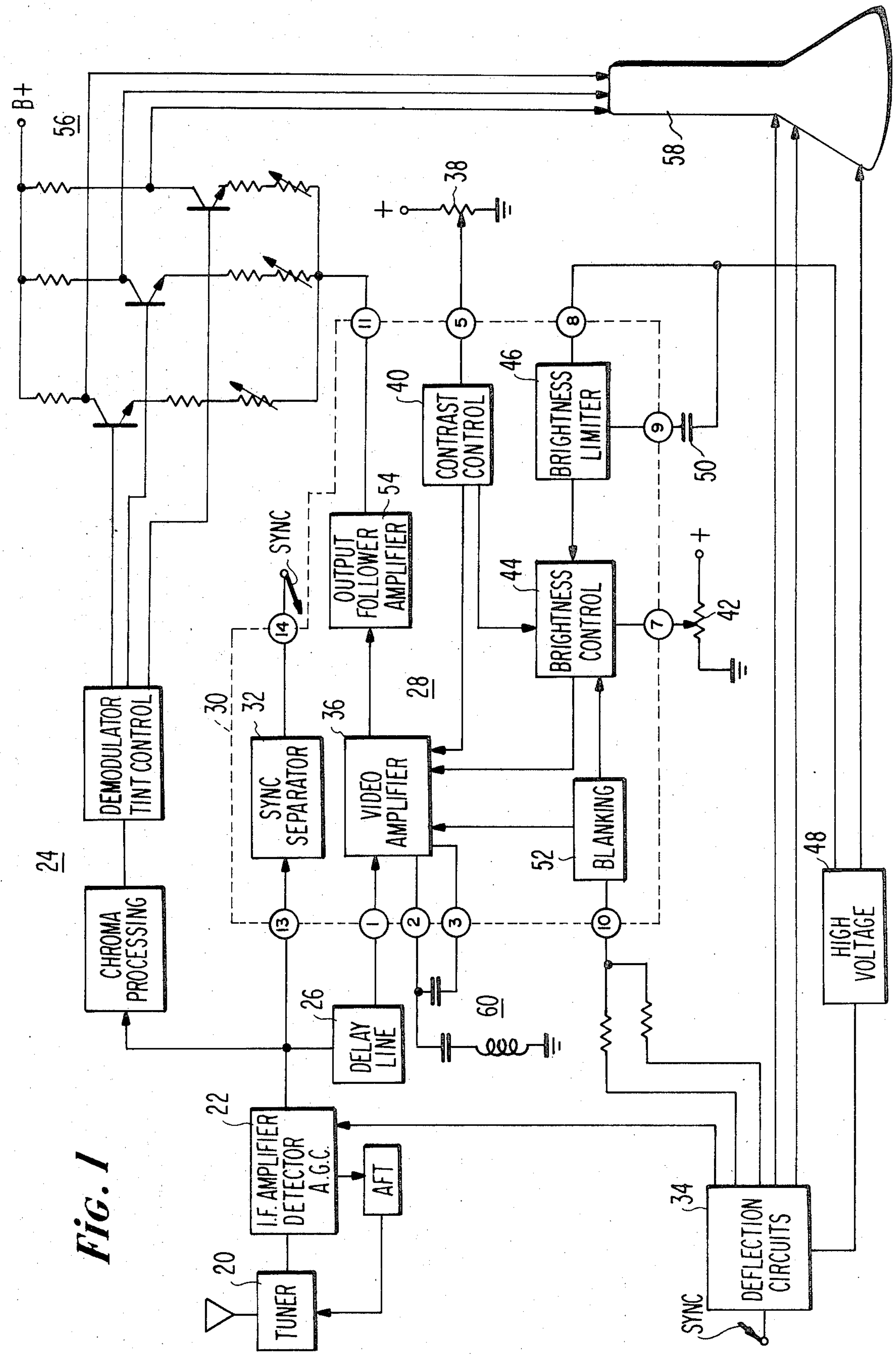
FIG. 1 illustrates, partially in block form and partially in schematic circuit diagram form, the general arrangement of a color television receiver employing video signal processing circuits constructed in accordance with the present invention.

Referring to FIG. 1, the general arrangement of a color television receiver employing the invention includes a conventional arrangement of a tuner 20 coupled to an intermediate frequency (I.F.) amplifier, detector and automatic gain control (AGC) module 22. The output of the detector portion of module 22 is coupled via suitable networks (not shown) to a chrominance channel 24 and via a delay line 26 to a luminance or video signal processing channel 28. Elements of luminance channel 28 are enclosed within a dashed outline 30, the outline 30 including video signal processing functions which conveniently may be incorporated on a single monolithic integrated circuit. The video signal processing functions included within the confines of integrated circuit 30 comprise a synchronizing signal ("sync") separator 32 having an input terminal 13 coupled to the output of picture detector 22 and an output terminal 14 coupled to associated horizontal (line) and vertical (field) deflection circuits 34 of the receiver. Integrated circuit 30 further comprises a first controllable video signal amplifier stage 36 having an input terminal 1 coupled to the output terminal of luminance delay line 26. The signal gain of video amplifier 36 may be varied by means of a viewer-operated contrast control arrangement including a variable resistor 38 and a contrast control circuit 40. Resistor 38 is mounted external to integrated circuit 30 and is coupled across an operating voltage supply (+). A variable control voltage is coupled from resistor 38 to contrast control circuit 40 via terminal 5 of integrated circuit 30.

The direct voltage level at the output of video amplifier 36 also may be varied by means of a brightness-controlling variable resistor 42 which is coupled via terminal 7 to a brightness control circuit 44 within integrated circuit 30.

An automatic brightness limiter (ABL) arrangement 46, responsive to the operation of the high voltage generating circuits 48 of the receiver, is also coupled to brightness control circuit 44. A filter capacitor 50, associated with brightness limiter 46, is connected between terminals 8 and 9 of integrated circuit 30.

Horizontal and vertical blanking signals, derived from the deflection circuits 34, are supplied to video amplifier 36 via terminal 10 and blanking circuits 52 (which are also included on integrated circuit 30). The blanking information preferably also is coupled to brightness control circuit 44 as will be explained below in connection with FIGS. 2 and 3.

The video (luminance) output signals produced by video amplifier 36 are coupled via voltage follower amplifier 54 and terminal 11 to a matrixing circuit 56 for combination with demodulated color-representative signals provided by the chrominance channel circuitry 24. Resultant signals representative of red, green and blue (R,G,B) color information are coupled to a color image-reproducing picture tube 58.

Frequency selective signal peaking circuitry 60 (which may be adjustable) is connected to video amplifier 36 between terminals 2 and 3 of integrated circuit 30.

The general circuit arrangement shown in FIG. 1 is suitable for use in a color television receiver of the type shown, for example, in RCA Color Television Service Data 1970 No. T19 (a CTC-49 type receiver), published by RCA Corporation, Indianapolis, Indiana.

Figure 2:
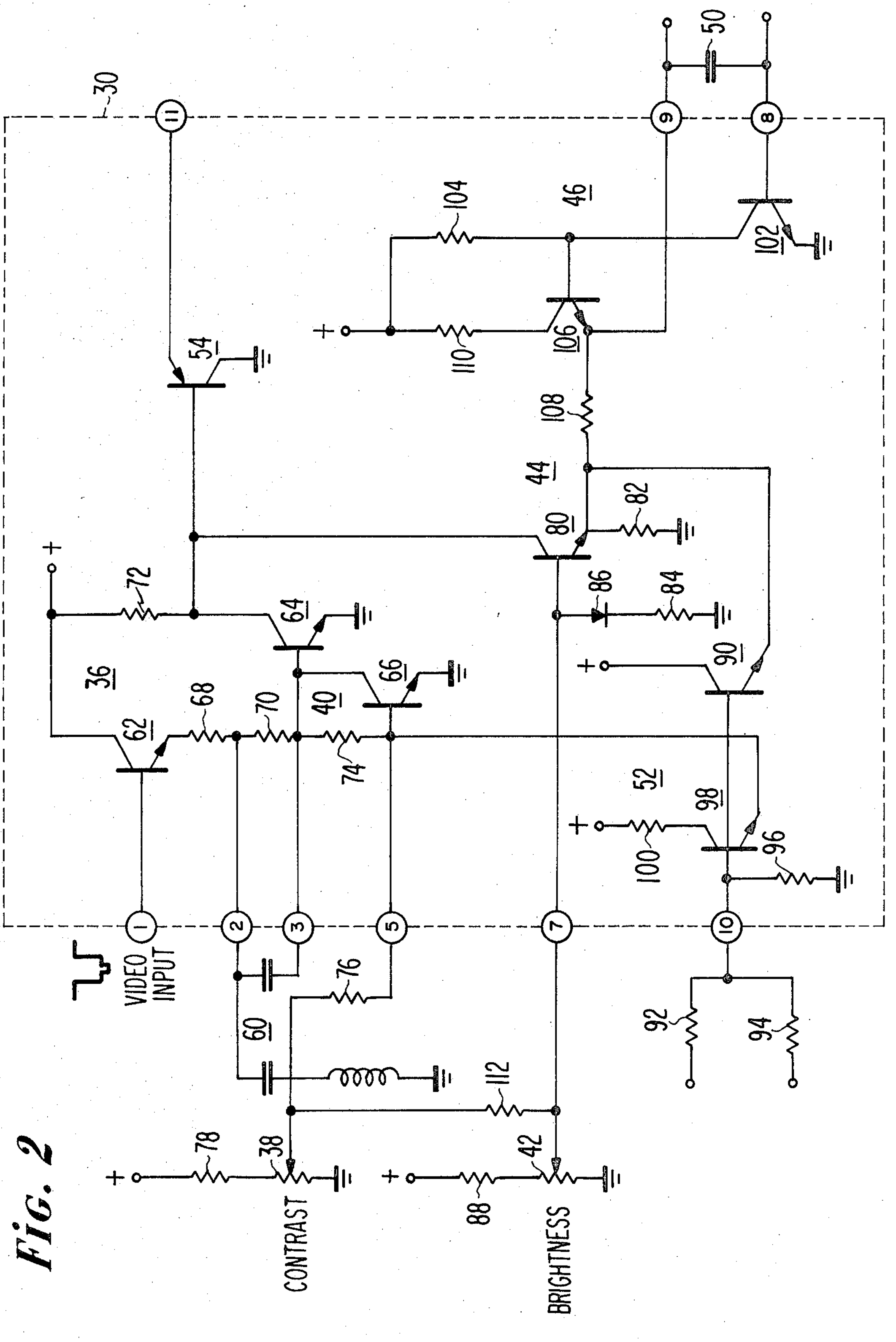
FIG. 2 is a schematic circuit diagram of a first video signal processing circuit, suitable for construction in monolithic integrated form embodying the present invention.

Referring to FIG. 2, a video signal processing circuit embodying the invention and suitable for use in the general arrangement of FIG. 1 is illustrated. Circuit elements of FIG. 2 which correspond to those illustrated in FIG. 1 are identified by the same reference numerals.

In FIG. 2, detected video signals having synchronizing signals which extend in a negative direction (i.e., "sync negative video") are supplied via terminal 1 of integrated circuit 30 to a controllable-gain video amplifier 36, the amplifier comprising first, second and third transistors 62, 64 and 66. Transistors 62, 64 and 66 are arranged as a gain-controllable amplifier of the type described in U.S. Pat. No. 3,579,133, granted May 18, 1971 to Jack R. Harford and assigned to the same assignee as the present application. In such a configuration, transistor 62 is arranged as a common collector amplifier and supplies signals via a series combination of resistors 68 and 70 to the base electrode of common emitter amplifier transistor 64. Amplified signals are developed across a load resistor 72 and are coupled via an output emitter follower transistor 54 (a PNP type) to terminal 11. The gain (transconductance) associated with transistor 64 is controllable in the manner described in the Harford patent by means of the combination of transistor 66, associated resistors 74, 76, 78 and 38 and a source of voltage (+) coupled across resistors 78 and 38. Resistor 38 serves as a viewer-operated contrast control and is operative to vary the quiescent base-emitter voltage, and hence the transconductance, of amplifier transistor 64. That is, the quiescent base-emitter voltage of amplifier transistor 64 is equal to the difference between the base-emitter voltage of control transistor 66 and the voltage across a relatively small resistor 74 connected between base and collector of transistor 66. Variation of the contrast control 38 varies current flow in and hence the voltage drop across resistor 74 which, in turn, varies the base-emitter voltage and transconductance of transistor 64. Thus, as the wiper of the contrast control 38 is moved towards a more positive voltage, current in resistor 74 increases and the base-emitter voltage of amplifier transistor 64 decreases. The transconductance of transistor 64, the amplifier gain and the resultant image contrast therefore decrease. Conversely, movement of the control 38 towards ground increases the transconductance of transistor 64 and therefore increases contrast of the image on the associated display device (e.g., 58 of FIG. 1).

A brightness control circuit 44 associated with video amplifier 36 comprises a variable impedance direct current path, including the collector-emitter circuit of a transistor 80, coupled in parallel with the collector-emitter path of amplifier transistor 64. A resistor 82 is connected between the emitter of transistor 80 and ground. The series combination of a further resistor 84 and a diode 86 (which may be fabricated as a transistor having base and collector electrodes shorted together) is connected between the base of transistor 80 and ground. The direct operating current of transistor 80 is set by means of the viewer-operated brightness control which comprises variable resistor 42 connected in series with a limiting resistor 88 across a voltage source (+). The brightness component (i.e., the direct voltage level) of the video signals produced at the collector of amplifier transistor 64 may be varied by varying brightness control resistor 42. For example, if the wiper of brightness control resistor 42 is moved to a more positive (higher) voltage level, current in diode 86 and resistor 84 will increase. A proportional (e.g., equal) change in direct current flow in the collector-emitter path of transistor 80 will be produced. A corresponding increase in the direct voltage drop across load resistor 72 and a lowering of the direct voltage output at terminal 11 will be produced. The effect of this change in direct voltage level at terminal 11 will be to increase the brightness of the image produced on picture tube 58 (FIG. 1). Conversely, movement of the wiper of brightness control 42 towards ground will produce decreased conduction in transistor 80, an increase in direct voltage at terminal 11 and a decrease in image brightness.

The above-described brightness control arrangement lends itself to a relatively simple and readily integrable video blanking arrangement 52 employing a transistor 90 having an emitter-collector path direct coupled in parallel with the similar path of transistor 80 and load resistor 72. To this end, the emitter of transistor 90 is connected to the emitter of transistor 80 while the collector of transistor 90 is connected to the operating voltage supply (+). Blanking signals (vertical and horizontal) are supplied via resistors 92 and 94 and terminal 10 to the base of transistor 90. A resistor 96 is also coupled between the base of transistor 90 and ground. The applied blanking signals are of positive polarity and turn transistor 90 on, thereby shunting the current from brightness control circuit 44 so as to cause the voltage at the collector of transistor 64 to rise towards the supply voltage (+) level. In order to provide complete cutoff of current through load resistor 72 during blanking, an additional transistor 98 is provided in blanking circuit 52. The collector of transistor 98 is coupled via a resistor 100 to the operating supply (+). The base of transistor 98 is supplied with blanking signals via terminal 10. The emitter of transistor 98 is coupled to the base of transistor 66 in the contrast (gain) control circuit of amplifier transistor 64. When the positive polarity blanking signals are applied to the base of transistor 98, an increased current through and voltage drop across resistor 74 are produced. The base-emitter voltage and transconductance of amplifier 64 are thereby reduced so as to effectively cut off current flow in resistor 72 from transistor 64. The desired blanking function is thereby insured regardless of the level of video signal at terminal 1.

The illustrated brightness control circuit 44 also is particularly well suited for operation in conjunction with an automatic brightness limiting (ABL) circuit 46, portions of which are incorporated on integrated circuit 30. The illustrated automatic brightness limiting circuit 46 comprises a common emitter transistor amplifier 102 having a base electrode coupled to terminal 8 for application of signals representative of electron beam current in the associated image-reproducing tube 58 (FIG. 1). Operating voltage is supplied to the collector of transistor 102 from the voltage supply (+) via a resistor 104. The base of a further transistor 106 is connected to the collector of transistor 102 while the emitter of transistor 106 is coupled via a resistor 108 to the emitter of brightness control transistor 80. The collector of transistor 106 is coupled to the operating supply (+) via a resistor 110 while the emitter of transistor 106 is coupled via terminal 8 to filter capacitor 50.

The automatic brightness limiter circuit 46 operates in conjunction with beam current sensing circuitry (not shown) associated with the high voltage generating apparatus (FIG. 1) of the receiver. Typical beam current sensing circuitry is shown, for example, in U.S. Pat. No. 3,674,932 of Dal F. Griepentrog, granted July 4, 1972 which is assigned to the same assignee as the present invention. In normal operation, the beam current sensing circuitry supplies a direct operating bias to the base of transistor 102 so as to maintain that transistor conductive and thereby maintain transistor 106 nonconductive. If the beam current increases beyond a desired limit, the circuit is arranged so that conduction of transistor 102 decreases, transistor 106 becomes conductive and current flow in transistor 80 decreases. The brightness component of the signal at the collector of transistor 64 is thereby controlled and limited.

In the earlier discussion of the contrast control circuit 40, it was stated that adjustment of the variable resistor 38 serves to change the transconductance of video amplifier transistor 64. In addition, some change in the direct voltage level (i.e., the brightness information) at the collector of transistor 64 will also be produced as resistor 38 is adjusted. Such change may be modified by coupling an appropriate resistor 112 between resistors 38 and 42 so that the black level or brightness can be held constant or made to vary in a preferred manner whenever resistor 38 is varied.

Figure 3:
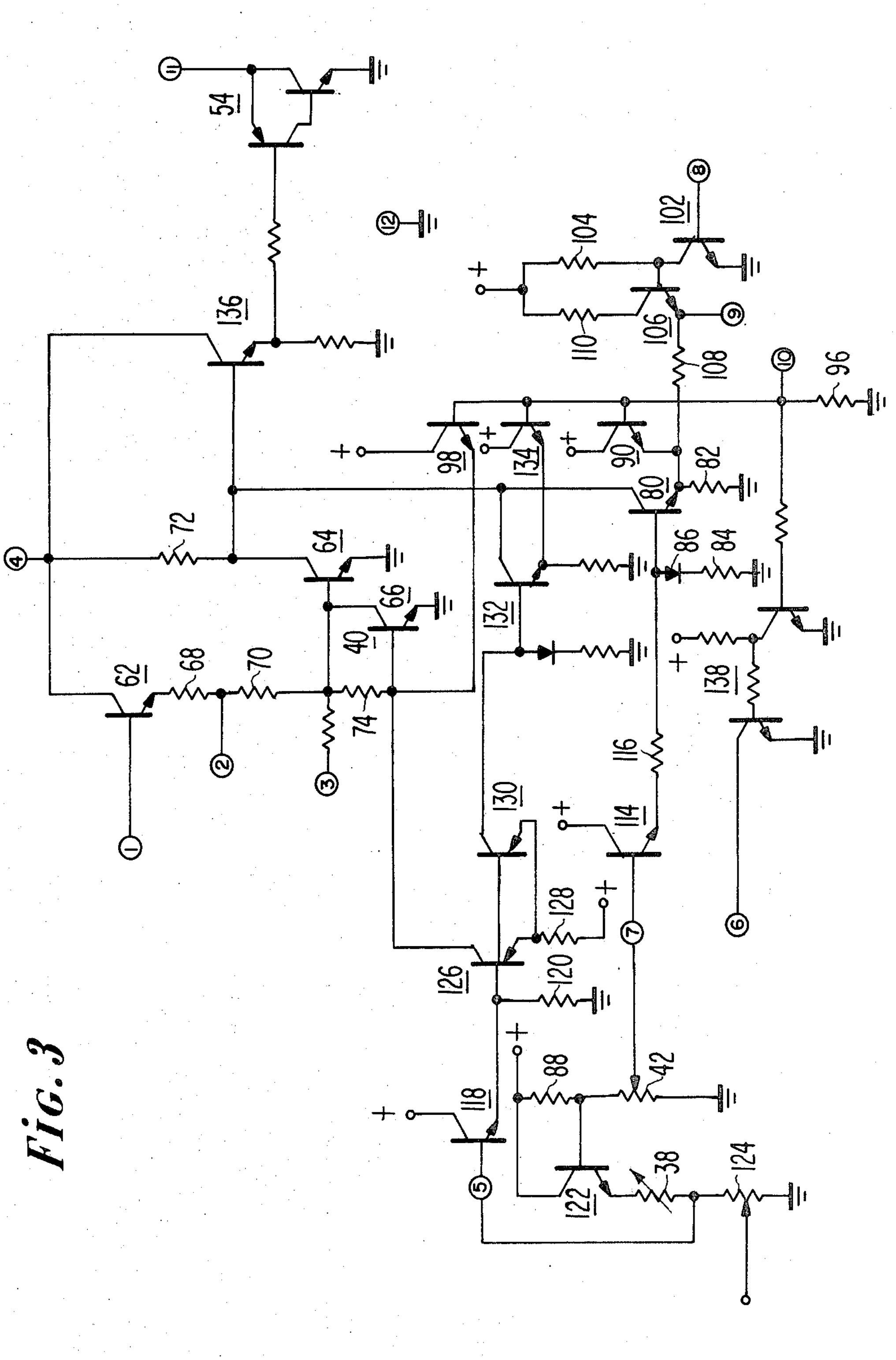
FIG. 3 is a schematic circuit diagram of a second video signal processing circuit, also suitable for construction in monolithic integrated form embodying the present invention.

Referring to FIG. 3, a modified version of the circuit arrangement of FIG. 2 is shown. Circuit elements which correspond to those in FIG. 2 are identified by the same reference numerals and will not be discussed in detail.

In the brightness control elements associated with terminal 7, an isolating emitter follower transistor 114 and a series resistor 116 have been added to render the circuit operation less sensitive to tolerances associated with circuit components exterior to the integrated circuit 30.

Similarly the contrast control elements associated with terminal 5 include an emitter follower transistor 118 and a resistor 120. In addition, the viewer-operated control 38 is coupled to the voltage supply (+) via resistor 88 and the base-emitter circuit of transistor 122 so as to avoid any influence of variation of brightness control resistor 42 upon the contrast control circuits. Contrast control resistor 38 is returned to ground via a color saturation control resistor 124, the latter serving to adjust the gain of the chrominance channel 24 of FIG. 1. In such an arrangement, variation of the contrast control resistor 36 affects both the luminance and chrominance channels so as to maintain a desired relationship between the signals in such channels.

In the particular arrangement illustrated in FIG. 3, the sense or polarity of contrast and color gain controls is such that a phase inversion is required in one of the circuits. To this end, PNP inverter transistor 126 and an emitter resistor 128 are provided in the contrast control chain.

The cross-coupling function performed in the embodiment shown in FIG. 2 by resistor 112 is provided in FIG. 3 by means of a second PNP inverter transistor 130 and a current amplifier 132, the latter being similar to the combination of devices 80, 82, 84, 86. An additional blanking transistor 134 also is coupled to current amplifier 132 to remove the effect of the cross-coupling during blanking.

Additional elements provided in the FIG. 3 embodiment include a further video amplifier stage 136 and a two-stage blanking inverter 138. The latter is particularly useful for supplying amplified blanking pulses to the matrix amplifier 56 (FIG. 1) during servicing procedures.

In the operation of each of the arrangements shown in FIGS. 2 and 3, the "sync negative" video signals are applied at terminal 1 of integrated circuit 30. A direct voltage drop of one $V_{be}$ (i.e., approximately 0.6 volts) is produced across the base-emitter junction of transistor 62 so that the video signal supplied to amplifier transistor 64 is translated one $V_{be}$ closer to ground potential. This resultant video signal may be arranged such that transistor 64 is close to cutoff during the negative-going synchronizing signal peak. The black level of the video (i.e., the "porch" in the vicinity of sync peaks) may then be maintained in the vicinity of one $V_{be}$ above ground. Variation of the contrast control resistor 38 will produce very little change in that portion of the output of amplifier 64 corresponding to such low-level input signals. Black level of the resultant video output signals produced at terminal 11 will therefore tend to vary only slightly as contrast is varied, and, in any case, may be caused to vary to a preferred degree by proportioning the effect of the cross-coupling circuit 130, 132.

It should also be noted that each of the viewer-operated controls, for which relatively long leads must be provided for mounting at a convenient location, such as the front of the receiver, are direct current controls. That is, video signals are substantially absent from the terminals 5 and 7 of integrated circuit 30. Problems associated with signal radiation are therefore avoided in these configurations.

Other modifications of the circuit arrangements may also be made within the scope of the present invention and such modifications are intended to be covered herein.

What is claimed is:

1. Apparatus for processing video signals including image brightness-representative information comprising:
   - a transistor amplifier stage including a transistor device having input, output and common electrodes,
   - a source of image-representative video signals coupled to said input electrode,
   - means for supplying direct operating voltage for said amplifier device,
   - a load impedance coupled in circuit with said direct voltage supplying means and with said output and common electrodes, and image brightness controlling apparatus comprising
a variable conduction transistor having a main current path direct current coupled to said load impedance, said last-named transistor also having a control electrode, and
brightness controlling means coupled to said control electrode for varying direct current flow in said variable conduction transistor and for thereby varying direct current flow in said load impedance.

2. Apparatus in accordance with claim 1 wherein:
said load impedance is coupled between said voltage supplying means and said output electrode,
said main current path of said variable conduction transistor corresponds to the collector-emitter path thereof and said control electrode corresponds to the base electrode thereof, and
said brightness controlling means comprises a variable direct current supply coupled to said base electrode.

3. Apparatus in accordance with claim 2 wherein:
said variable direct current supply means comprises a variable voltage dividing resistor coupled across a voltage supply and having an adjustable tap direct current coupled to said base electrode of said variable conduction transistor.

4. Apparatus according to claim 1 wherein:
said image brightness controlling apparatus further comprises a first blanking transistor having a main current path coupled across the combination of said load impedance and said output and common electrodes of said amplifying device, said first blanking transistor further having a control electrode, and
said image brightness controlling apparatus further comprises a source of blanking signals coupled to said control electrode of said first blanking transistor for rendering said blanking transistor conductive and thereby reducing direct current flow through said load impedance.

5. Apparatus according to claim 1 wherein:
said image brightness controlling apparatus further comprises an automatic brightness limiting transistor having a main current path coupled across the combination of said load impedance and said output and common electrode of said amplifying device, said brightness limiting transistor further having a control electrode, and
said image brightness controlling apparatus further comprises a source of signals representative of existence of brightness limit conditions coupled to said control electrode of said brightness limiting transistor for rendering said limiting transistor conductive and thereby reducing direct current flow through said load impedance.

6. Apparatus according to claim 5 wherein:
said image brightness controlling apparatus further comprises a first blanking transistor having a main current path coupled across the combination of said load impedance and said output and common electrodes of said amplifying device, said first blanking transistor further having a control electrode, and
said image brightness controlling apparatus further comprises a source of blanking signals coupled to said control electrode of said first blanking transistor for rendering said blanking transistor conductive and thereby reducing direct current flow through said load impedance.

7. Apparatus according to claim 1 wherein:
the input, output and common electrodes of said amplifier device correspond to base, collector and emitter electrodes, respectively,
said transistor amplifier stage further comprising a gain controlling transistor having collector and emitter electrodes direct current coupled to said base and emitter electrodes, respectively, of said amplifier device, said gain controlling transistor further having a base electrode, a resistor direct current coupled between base and collector electrodes and a variable direct current source coupled to said last-named base electrode for varying direct current flow through said base-collector resistor and thereby varying signal gain of said transistor amplifier device.

8. Apparatus according to claim 7 wherein:
said brightness controlling apparatus further comprises a second blanking transistor having an input circuit coupled to said source of blanking signals and an output circuit coupled to said base of said gain controlling transistor for reducing the gain of said amplifier device in response to blanking signals.

9. Apparatus according to claim 7 wherein:
said variable direct current source comprises a variable contrast control resistance coupled to a source of direct voltage, said apparatus further comprising means coupled between said contrast control resistance and said load impedance for maintaining direct current flow through said load impedance substantially independent of adjustment of said contrast control resistance.

* * * * *